US011505167B2

(12) United States Patent
Yamamoto et al.

(10) Patent No.: US 11,505,167 B2
(45) Date of Patent: Nov. 22, 2022

(54) AIRCRAFT BRAKE CONTROL SYSTEMS

(71) Applicant: The Boeing Company, Chicago, IL (US)

(72) Inventors: David T. Yamamoto, Mill Creek, WA (US); Steven Elliot Smith, Mill Creek, WA (US); Nima Forghani, Seattle, WA (US); Bruce Van Deventer, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 16/735,406

(22) Filed: Jan. 6, 2020

(65) Prior Publication Data

US 2021/0206357 A1 Jul. 8, 2021

(51) Int. Cl.
*B60T 8/17* (2006.01)
*B60T 7/04* (2006.01)
*B60T 8/32* (2006.01)
*B60T 13/74* (2006.01)
*B64C 25/46* (2006.01)

(52) U.S. Cl.
CPC ............ *B60T 8/1703* (2013.01); *B60T 7/042* (2013.01); *B60T 8/325* (2013.01); *B60T 13/741* (2013.01); *B60T 2270/82* (2013.01); *B64C 25/46* (2013.01)

(58) Field of Classification Search
CPC ........ B60T 8/1703; B60T 7/042; B60T 8/325; B60T 13/741; B60T 2270/82; B64C 25/46
USPC ......................................................... 701/70
See application file for complete search history.

(56) References Cited

U.S. PATENT DOCUMENTS

| 5,180,214 | A  | * | 1/1993  | Yeh      | B60T 8/1703 |
|           |    |   |         |          | 701/71      |
| 6,296,325 | B1 | * | 10/2001 | Corio    | B60T 8/1703 |
|           |    |   |         |          | 318/362     |
| 9,509,325 | B1 | * | 11/2016 | Duryea   | H03M 1/1245 |
| 9,656,641 | B2 |   | 5/2017  | Griffith et al. |      |
| 2004/0239173 | A1 | | 12/2004 | Williams et al. |    |
| 2008/0142318 | A1 | | 6/2008  | Griffith et al. |     |
| 2010/0292889 | A1 | | 11/2010 | Cahill et al. |       |
| 2020/0001984 | A1 | | 1/2020  | Hubbard et al. |      |

FOREIGN PATENT DOCUMENTS

| EP | 3309023      | 4/2018 |
| WO | WO 2008/115306 | 9/2008 |

OTHER PUBLICATIONS

European Patent Office, Extended European Search Report for related European Patent Application No. 20208655, dated May 18, 2021.

* cited by examiner

*Primary Examiner* — Gertrude Arthur Jeanglaude
(74) *Attorney, Agent, or Firm* — Kolitch Romano Dascenzo Gates LLC

(57) ABSTRACT

Brake control systems are disclosed herein. A brake control system comprises a first set of analog-to-digital converters in electrical communication with a first set of brake input mechanism sensors and a second set of analog-to-digital converters in electrical communication with a second set of brake input mechanism sensors. The first and second sets of analog-to-digital converters comprise one or more of different hardware and different software for differentially manipulating sensor outputs received from the brake input mechanism sensors.

20 Claims, 3 Drawing Sheets

AIRCRAFT BRAKE CONTROL SYSTEMS

FIELD

The present disclosure relates to aircraft brake control systems.

BACKGROUND

Like other aircraft systems, federal regulations require that aircraft brake systems include redundancies or back-ups to ensure safety and performance. For example, brake systems may be required to dedicate at least three brake pedal sensors to each brake pedal to ensure that the desired braking force is correctly determined in order to avoid unwanted braking during take-off and/or insufficient braking during landing. Because most brake systems include at least four brake pedals (two for the captain and two for the first officer), the number of sensors and associated wiring required to meet safety regulations multiplies quickly, increasing the cost and complexity of such systems.

To reduce the amount of wiring needed, some braking systems may route only the left-side brake pedals' information to one brake system control unit (BSCU), and only the right-side brake pedals' information to the other brake system control unit. However, this asymmetric BSCU architecture can cause an uncommanded turn if one of the BSCUs non-performs. This is because the healthy remaining BSCU can only control one side of the aircraft's brakes—either the brakes on the left-side landing gear or the brakes on the right-side landing gear. Application of only the left-side brakes or only the right-side brakes when a plane is moving causes the aircraft to turn.

Further, many conventional brake systems provide a mechanical link between the captain's brake pedals and the first officer's brake pedals that physically link the pedals. Because of this fixed attachment, depression of one pilot's brake pedals necessarily depresses the other's brake pedals as well. However, this approach precludes the captain and first officer from independently controlling the braking system, which can be problematic when a captain needs to override an erroneous first officer braking input, or vice versa.

Thus, a simpler, cheaper, and safer brake control system that reduces wiring and other electrical circuitry provides symmetric inboard/outboard braking that prevents uncommanded turning, and enables independent captain-first-officer control, is desired.

SUMMARY

Aircraft brake control systems are disclosed. For example, a brake control system comprises a first set of analog-to-digital converters in electrical communication with a first set of brake input mechanism sensors and a second set of analog-to-digital converters in electrical communication with a second set of brake input mechanism sensors. The first and second sets of analog-to-digital converters comprise one or more of different hardware and different software for differentially manipulating sensor outputs received from the brake input mechanism sensors.

DESCRIPTION

Figure 1:
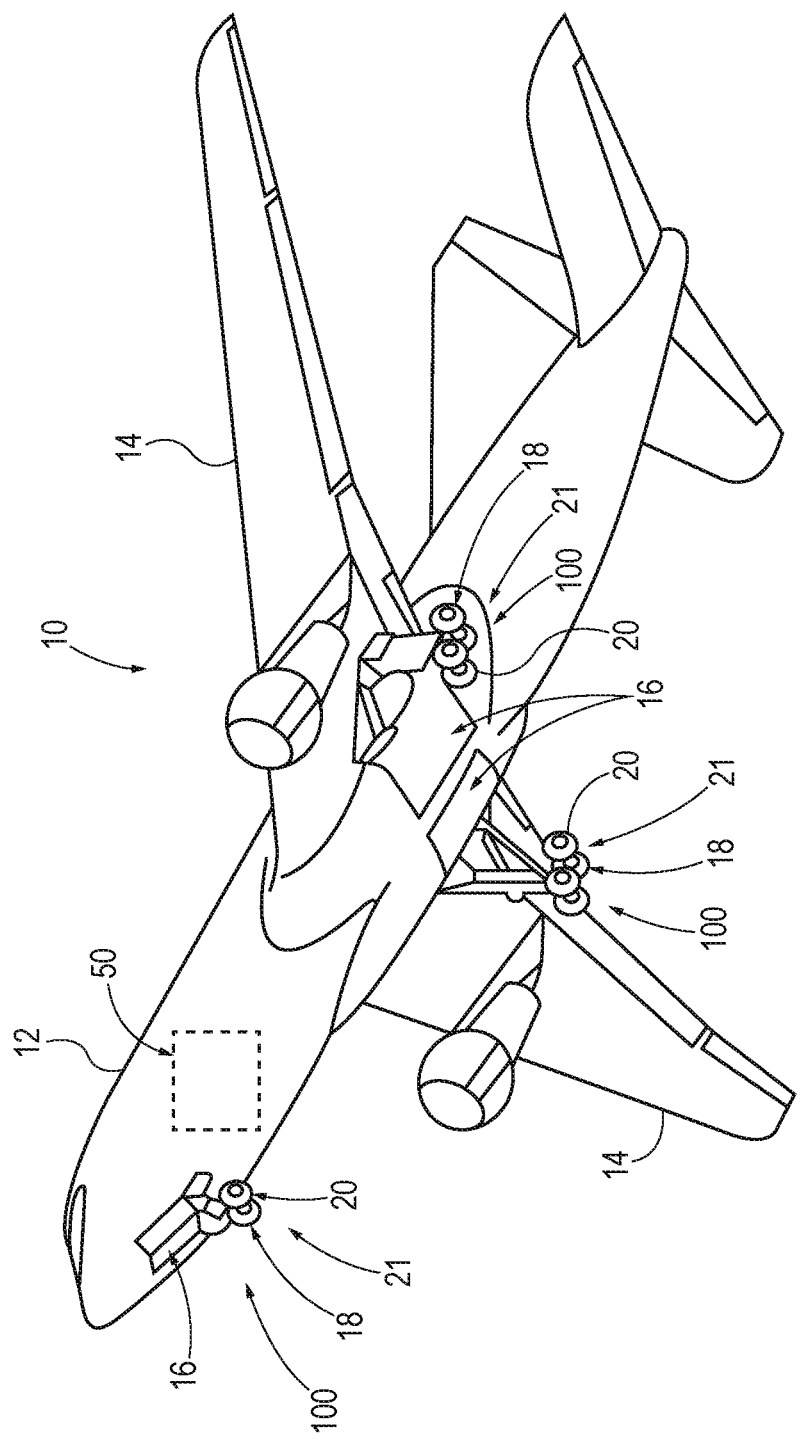
FIG. 1 is a schematic representation of an example aircraft that includes a brake control system, according to the present disclosure.

FIG. 1 is a schematic illustration of an example aircraft 10 that includes a brake control system 50 according to the present disclosure. Aircraft 10 generally may be utilized to transport persons and/or cargo. As illustrated in FIG. 1, aircraft 10 generally includes a fuselage 12 and a wing assembly 14 operatively coupled to fuselage 12. Fuselage 12 and/or wing assembly 14 define one or more wheel wells 16 (and/or landing gear storage bays and/or wheel storage bays) operatively coupled to and/or configured to receive a corresponding landing gear structure 18. Landing gear structure 18 may include a wheel assembly 20 operatively coupled to fuselage 12 and/or wing assembly 14 via a strut assembly 100 and/or a lever assembly 21. Brake control systems 50 operatively control a braking force applied to the wheels of the wheel assembly 20. In particular, and as will be described in greater detail below with reference to FIGS. 2 and 3, the brake control systems 50 may include one or more brake system control units (BSCUs) and one or more brakes in electronic communication with the BSCUs to control the brakes and adjust the braking force applied to the wheels of the wheel assembly 20.

Figure 2:
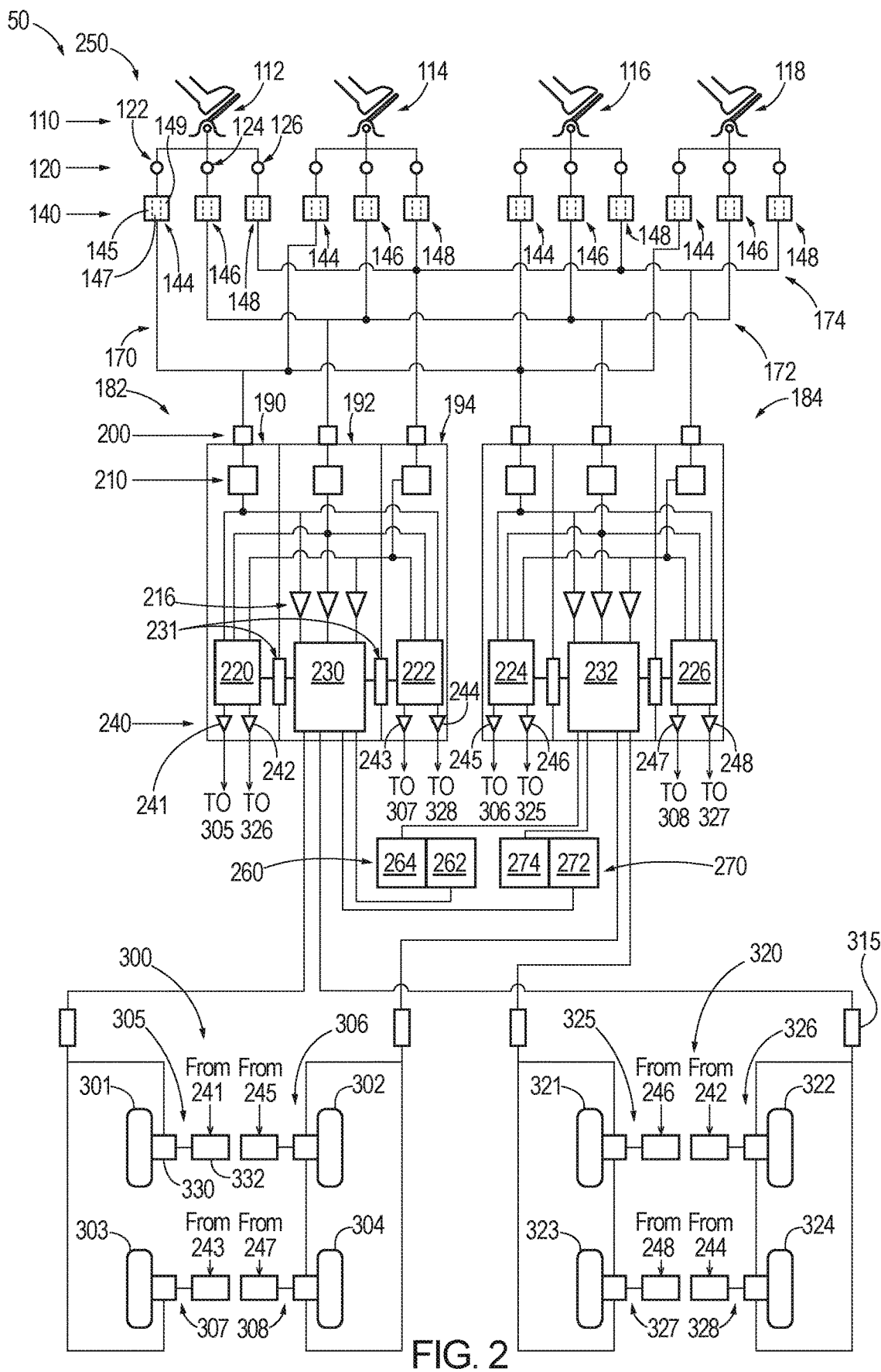
FIG. 2 is a schematic diagram representing a first example brake control system that utilizes vehicle buses to transfer sensor signals to brake system control units, according to the present disclosure.
Figure 3:
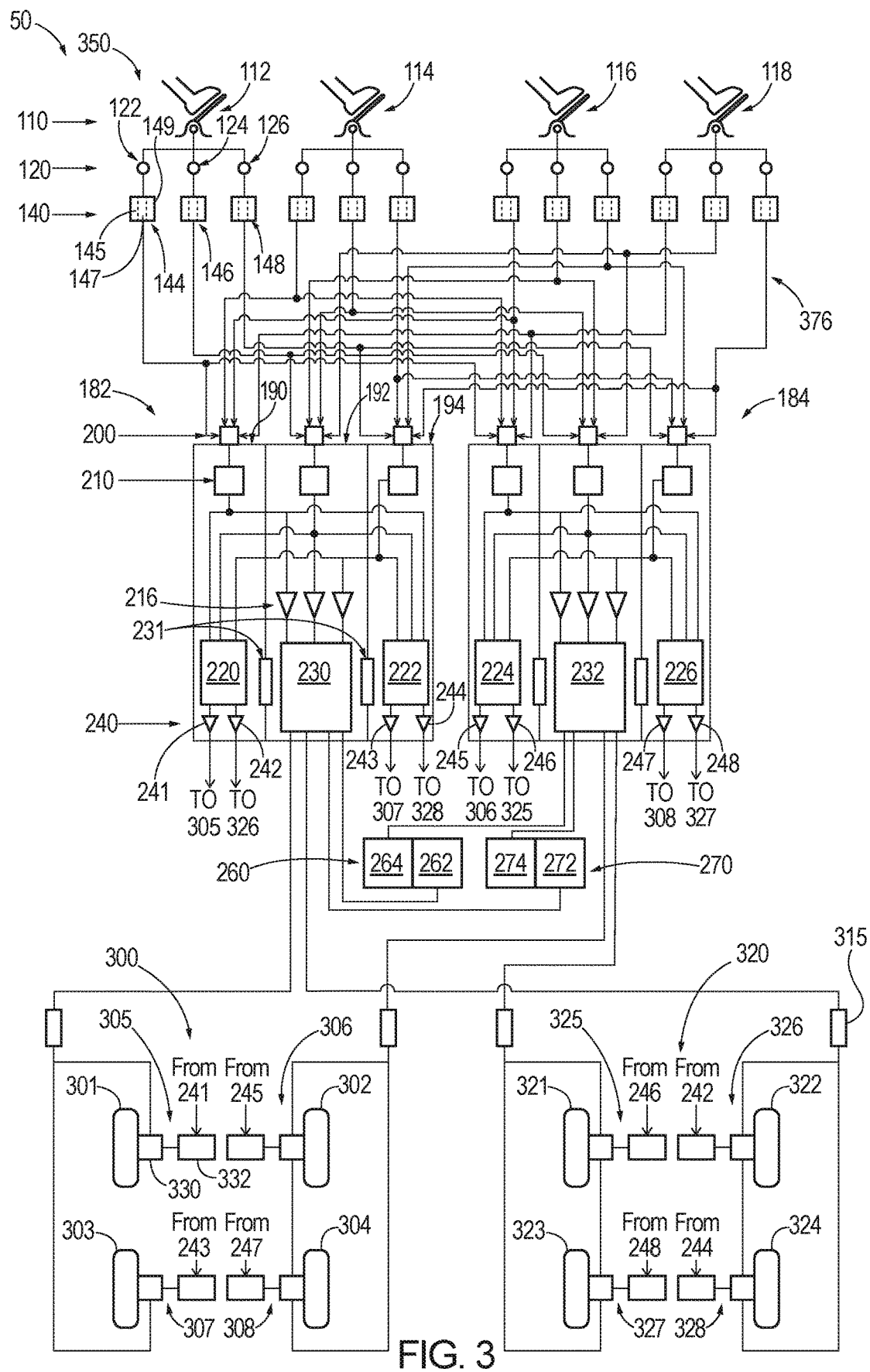
FIG. 3 is a schematic diagram representing a second example brake control system that utilizes redundant wiring to transfer sensor signals to brake system control units, according to the present disclosure.

FIGS. 2 and 3 show schematic representations of illustrative, non-exclusive examples of brake control systems 50 according to the present disclosure. FIG. 2 shows a first example brake control system 250 of the brake control systems 50 that comprises one or more vehicle buses for providing electrical communication between brake input mechanism sensors and brake system control units (BSCUs). FIG. 3 shows a second example brake control system 350 of brake control systems 50 that comprises a plurality of wires for providing electrical communication between brake input mechanism sensors and BSCUs. The first and second example brake control systems 250 and 350 generally include the same and/or similar components except that the electrical coupling between the sensors and the BSCUs is different, as described above. Thus, FIGS. 2 and 3 are described collectively herein, along with a specific discussion of this wiring difference.

As schematically illustrated in FIGS. 2 and 3, brake control systems 50 comprise converters 140 that manipulate (e.g., convert, demodulate, and/or encode) the outputs of brake input mechanism sensors 120. In addition to the converters 140, the brake control systems 50 may include various optional components (e.g., the sensors 120, BSCUs 182 and 184, etc.) that will be discussed herein. The brake input mechanism sensors 120 are configured to provide an indication of a desired braking force (captain and/or first officer commanded braking force) to one or more BSCUs (e.g., first and second BSCUs 182 and 184 respectively), by measuring an operating state (e.g., degree of actuation) of brake input mechanisms 110 (e.g., brake pedals). The converters 140 feed the information about the operating state of the brake input mechanisms 110 to one or more of the BSCUs 182 and 184, which are configured to selectively adjust braking forces applied to wheels of a left-side landing gear 300 and a right-side landing gear 320 based on the received information. The converters 140 comprise a safety feature that reduces the likelihood that inadvertent/erroneous signals (which may be caused by any number of known or unknown non-performance events) will propagate to the BSCUs, which enhances braking performance and safety. In one example, the converters 140 comprise a multiple-redundant design that provides this enhanced safety through the use of dissimilar hardware and/or software. By using heterogeneous hardware and/or software, the converters 140 increase brake reliability and performance by reducing the chances that a software and/or hardware error in one converter will negatively affect braking. Specifically, use of non-uniform hardware and/or software ensures that the converters 140 do not all simultaneously suffer a common non-performance event that would result in inadvertent or uncommanded braking (i.e. uncommanded/inadvertent braking when braking is not desired (e.g., at take-off), or simultaneous loss of multiple sources of braking power when braking is desired (e.g., during landing)).

While FIGS. 2 and 3 show particular quantities of certain components (e.g., twelve input mechanism sensors, twelve converters, two BSCUs each with two microcontrollers and one logic gate hardware device, four shut-off modules, four alternate brake actuators, eight primary brake actuators, eight wheels, etc.), the brake control systems 50 may include other numbers of these same components in other examples. In one example, the brake control systems 50 only includes only one BSCU, even though FIGS. 2 and 3 show the brake control systems 50 having two BSCUs. Thus, more or fewer numbers of the same components may be utilized without departing from the scope of this disclosure. Moreover, not all of the components shown in FIGS. 2 and 3 are required in all examples of brake control systems 50.

In some examples, the brake control systems 50 include the brake input mechanisms 110. The brake input mechanisms 110 are user input mechanisms that are selectively adjustable by a user (e.g., captain and/or first officer) to indicate a desired braking force. In some examples where they are included, the brake input mechanisms 110 include left-side and right-side captain brake input mechanisms 112 and 114, respectively, and left-side and right-side first officer brake input mechanisms 116 and 118, respectively. The left-side captain brake input mechanism 112 is configured to be selectively adjusted by a captain to apply left-side brakes (e.g., brakes of left-side landing gear 300), and the right-side captain brake input mechanism 114 is configured to be selectively adjusted by the captain to apply right-side brakes (e.g., brakes of right-side landing gear 320). Similarly, the left-side first officer brake input mechanism 116 is configured to be selectively adjusted by a first officer to apply the left-side brakes, the right-side first officer brake input mechanism 118 is configured to be selectively adjusted by the first officer to apply the right-side brakes.

Although FIGS. 2 and 3 show four brake input mechanisms, in other examples, the brake control systems 50 may include fewer and/or more than four brake input mechanisms. As one such example, the brake control systems 50 include only left and right-side captain brake input mechanisms 112 and 114, and no first officer brake input mechanisms. In other such examples, the brake control systems 50 include three or more captain brake input mechanisms.

In some examples, the brake input mechanisms 110 comprise mechanically actuated mechanisms. As one such example, the brake input mechanisms 110 comprise brake pedals such as foot pedals as schematically indicated in FIGS. 2 and 3. However, in other such examples, the brake input mechanisms 110 comprise another type of mechanically actuated input mechanisms such as one or more of a lever, joystick, button, etc. In other examples, the brake input mechanism 110 comprises an electrically actuated mechanism such as a touchscreen.

As discussed above, the brake input mechanisms 110 are configured to be selectively adjusted, manipulated, and/or actuated by a user (e.g., captain and/or first officer) to indicate an amount of braking force desired by the user. Thus, in the description herein, the term "actuation state" is used to refer to the state of the brake input mechanisms 110 resulting from user manipulation/actuation (or lack thereof) of the brake input mechanisms 110, which in turn corresponds to the amount of user-desired braking. The actuation state of the brake input mechanisms 110 may refer to different parameters depending on the type of mechanism being utilized.

As one such example, when the brake input mechanisms 110 comprise mechanically adjustable brake pedals, the actuation state of the brake input mechanisms 110 refers to a position of the brake pedals and/or an amount of displacement of the brake pedals relative to a fully disengaged position (corresponding to no desired braking). As one such example, where the brake input mechanisms 110 comprise depressible brake pedals, the actuation state of the brake input mechanisms 110 refers to an amount of depression of the brake pedals (e.g., not depressed, partially depressed, fully depressed, etc.).

However, in other such examples where the brake input mechanisms 110 comprise electrically actuated input mechanisms, the actuation state may refer to changes in the electric current running through the electrically actuated input mechanisms resulting from user manipulation of the electrically actuated input mechanisms, for example.

To measure the actuation state of the brake input mechanisms 110 (and therefore the desired amount of braking), the brake control systems 50 include the brake input mechanism sensors 120, in some examples. In some such examples, such as the examples shown in FIGS. 2 and 3, the brake control systems 50 include multiple sensors per brake input mechanism to provide multiple (i.e. redundant) measurements of the actuation state of each brake input mechanism. In one such example, the brake control systems 50 include three of the brake input mechanism sensors 120 for each of the brake input mechanisms 110. Thus, in the example of FIGS. 2 and 3, the brake control systems 50 are shown to include three sensors for the left-side captain brake input mechanism 112, three sensors for the right-side captain brake input mechanism 114, three sensors for the right-side first officer brake input mechanism 116, and three sensors for the right-side first officer brake input mechanism 118. However, in other examples, fewer or more than three sensors are included per brake input mechanism.

In some examples, each of the sensors 120 is only configured to measure the actuation state of one of the brake input mechanisms 110. However, in other examples, one or more of the sensors 120 are electrically connected to more than one of the brake input mechanisms 110. In such examples, the more than one of the brake input mechanisms 110 that are connected to a single sensor are treated as a single input mechanism.

The brake input mechanism sensors 120 comprise sensors capable of measuring the actuation state of the brake input mechanisms 110. Thus, the type of sensor employed by the brake input mechanism sensors 120 depend on the type of brake input mechanism the sensors are configured to measure. For example, when the brake input mechanisms 110 comprise mechanically actuated mechanisms, such as brake pedals, the brake input mechanism actuation state sensors 120 may comprise position sensors. In some such examples, the sensors 120 comprise one or more of linear variable differential transformers (LVDTs), rotation variable differential transformers (RVDTs), potentiometers, capacitive position sensors, Hall effect sensors, piezo-electric transducers, etc. However, in other such examples, the sensors may comprise a static force sensor or other type of non-position sensor.

In other examples, such as where the brake input mechanisms 110 comprise electrically actuated mechanisms like touchscreens, the sensors 120 comprise a different type of sensor, such as a voltage-sensitive touchscreen sensor (e.g., capacitive and/or resistive touch screen sensor).

Each of the sensors 120 may output an analog signal that encodes the actuation state (indicating the desired braking force) of the brake input mechanism 110 with which it is associated. That is, the sensors 120 convert user inputs received via the brake input mechanisms 110 into analog signals that are indicative of a desired amount of braking.

In sum, a captain and/or first officer actuates one or more of the brake input mechanisms 110 to indicate a desired amount of braking. The mechanical or electrical adjustment of the brake input mechanisms 110 by the captain and/or first officer is converted into analog signals by the sensors 120 (e.g., LVDT sensors), which are then converted to digital signals by the converters 140.

The converters 140 receive the analog signals output by the sensors 120 and convert those analog signals to digital signals. In examples where the brake control systems 50 include one or more vehicle buses, like in the example of FIG. 2, the digital signals comprise vehicle bus signals (e.g., CAN bus signals, LIN bus signals), and the converters 140 therefore convert the analog signals to vehicle bus signals, such as CAN bus signals. The converters additionally or alternatively may demodulate and/or encode the analog signals received from the sensors 120.

To perform the analog-to-digital conversion and/or the demodulation, the converters 140 comprise hardware and associated software. In particular, the converters 140 comprise integrated circuits (the hardware) that form a processing unit (also commonly referred to as a logic integrated circuit) and a memory unit. The memory unit stores computer-readable instructions (the software) that are executable by the processing unit to perform various computing functions such as the signal converting and demodulation. The processing unit comprises one or more of: field-programmable gate arrays (FPGAs), application-specific integrated circuits (ASICs), digital signal processors (DSPs), microprocessors, microcontrollers, programmable array logic (PALs), complex programmable logic devices (CPLDs), or other circuitry/hardware capable of converting the analog signals output by the sensors 120 to digital signals. The memory unit comprises volatile (e.g., RAM, SRAM, DRAM) and/or non-volatile (e.g., ROM, PROM, EPROM) memory.

Each of the converters 140 receives outputs from at least one of the sensors 120. In some examples, such as the examples of FIGS. 2 and 3, the brake control systems 50 include the same number of converters 140 as sensors 120. In some such examples, the converters 140 and the sensors 120 are electrically connected to one another in a one-to-one relationship such that each of the converters 140 is electrically connected to exactly one of the sensors 120, and each of the sensors 120 is electrically connected to exactly one of the converters 140. However, in other such examples, the converters 140 and sensors 120 are not connected in a one-to-one relationship. In other examples, the brake control systems 50 do not include the same number of converters 140 as sensors 120.

In the example of FIGS. 2 and 3, the converters 140 comprise three sets of converters: a first set of converters 144, a second set of converters 146, and a third set of converters 148. In some such examples, the first set of converters 144 is electrically connected to (i.e. in electrical communication with) a first set of sensors 122 of the sensors 120, the second set of converters 146 is electrically connected to a second set of sensors 124 of the sensors 120, and the third set of converters 148 is electrically connected to a third set of sensors 126 of the sensors 120. However, in other examples, the converters 140 comprise more then or less than three sets.

In some examples, each of the sets of sensors 122, 124, and 126 is configured to measure the actuation state of each of the input mechanism 112, 114, 116, and 118. Thus, one of the sensors of the first set of sensors 122, one of the sensors of the second set of sensors 124, and one of the sensors of the third set of sensors 126 are configured to measure the actuation state of the left-side captain brake input mechanism 112, and similarly other sensors from each of the sets of sensors 122, 124, and 126 are configured to measure the actuation states of the other three input mechanisms 114, 116, and 118. Thus, as shown in the example of FIGS. 2 and 3, the sensors 120 include a total of twelve sensors, with each set of sensors 122, 124, and 126 comprising four sensors, one for each input mechanism 112, 114, 116, and 118.

As described above, the converters 140 include a safety feature for preventing common mode non-performance events from negatively impacting braking performance. The common mode non-performance events may include inadvertent outputs from the sensors 120 (e.g., caused by non-performance of the sensors), inadvertent non-performance of the hardware of the converters 140, inadvertent non-performance of the software of the converters 140, etc. In one example, the converters 140 do not all utilize the same hardware and/or software to manipulate the outputs from the sensors (e.g., demodulate the sensor signals, convert the sensor signals from analog to digital, and encode the signals) for transmission to the BSCUs. In particular, in such examples, the converters 140 comprise different sets of converters that each utilizes its own unique hardware and/or software. That is, the sets are distinguishable in that they utilize different hardware and/or software to one or more of: convert, demodulate, and encode the sensor outputs. In another example, the converters 140 utilize internal monitoring schemes to ensure the veracity of their outputs to the BSCUs.

In one example, the converters 140 utilize different hardware to manipulate the sensor outputs. As one such example, the sets of converters 144, 146, and 148 comprise logic gate type integrated circuits, such as FPGAs and/or ASICs, that are configured differently. For example, the logic gate type ICs may be wired differently by interconnecting the logic blocks differently. In yet another such example, the converters 140 comprise the same hardware, but include multiple channels (and respective ports) for connecting to the sensors 120. For example, as shown in FIGS. 2 and 3, the converters 140 are all identical in structure and circuitry, but include three channels: a first channel 145, a second channel 147, and a third channel 149. Only one of the channels 145, 147, or 149 is electrically connected to one of the sensors 120. To ensure that a common fault in one of the channels does not affect braking performance, the sets of converters 144, 146, and 148 are connected to their associated sensors via different channels. For example, the first set of converters 144 is electrically connected to the first set of the sensors 122 via the first channel 145, the second set of converters 146 is electrically connected to the second set of sensors 124 via the second channel 147, and the third set of converters 148 is electrically connected to the third set of sensors 126 via the third channel 149.

In another example, the converters 140 utilize different software (computer readable instructions) executable by the hardware (e.g., central processor, microprocessor, FPGA, etc.), to manipulate the sensor outputs. As one such example, the sets of converters 144, 146, and 148 comprise one or more of different computer readable instruction (i.e. lines of computer code), different algorithms, and/or different mathematical relationships for converting the analog sensor outputs to digital signals, such as CAN bus signals. As another example, the sets of converters 144, 146, and 148 comprise one or more of different computer readable instruction (i.e. lines of computer code), different algorithms, and/or different mathematical relationships for encoding the digital signals transmitted to one or more of the BSCUs 182 and 184.

In yet another example, the converters 140 utilize a combination of different hardware and different software to manipulate the sensor outputs. As one such example, the set of converters 144, 146, and 148 comprise microcontrollers with different circuitry, and therefore run different software.

In a still further example, the converters 140 include software for internally checking the received sensor outputs to ensure their veracity. As one such example, the software may include a feedback control loop, such as PID control, that screens out inadvertent sensor outputs (i.e. checks to make sure that the received sensor outputs are not erroneous). Thus, the converters 140 may internally monitor the signals before they are sent to the BSCU(s) to ensure that only accurate sensor outputs are carried on to the BSCU(s) for brake control.

By utilizing one or more of the above approaches (the internal monitoring scheme, and the utilization of different hardware and/or different software), a technical effect of increasing brake performance and safety is achieved. In particular, by utilizing a multiple redundant, dissimilar design for the converters 140 and/or using a feedback control mechanism for screening inadvertent sensor outputs, inadvertent outputs from the converters 140 (caused by any number of non-performance events of one or more components of the brake control system 50) may be reduced and/or prevented, thus ensuring that a more accurate indication of the desired braking force is provided to the BSCU(s). In this way, the BSCU(s) can command for a braking force that more closely aligns with the desired braking force requested by the captain and/or the first officer. Simply, the above approaches increase the integrity of the desired braking force signal, thereby providing the BSCU(s) with a more accurate indication of the desired braking force.

As described above, the converters 140 convert the analog sensor outputs to digital signals for one or more of the BSCUs 182 and 184. Thus, the converters 140 are in electric communication with the BSCUs 182 and 184 for transmitting the indication of the desired braking force (provided by the sensors 120) to the BSCUs. In some examples, the converters 140 are all directly electrically connected to both of the BSCUs 182 and 184. By electrically connecting all of the converters 140 to both BSCUs, both BSCUs receive inputs from all of the sensors 120, thereby ensuring symmetric braking even in the vent of non-performance of one of the BSCUs 182 or 184.

However, in other examples, one or more of the converters 140 is only directly electrically connected to one (not both) of the BSCUs 182 and 184. In some such examples, brake control systems 50 include converters for providing communication between the two BSCUs 182 and 184. Thus, even though the two BSCUs 182 and 184 do not receive information from all of the converters 140 directly in such examples, the BSCUs 182 and 184 may nonetheless receive information from all of the converters 140 indirectly, by sharing information between the BSCUs 182 and 184.

In yet further examples, the brake control systems 50 include only one BSCU. In some such examples, the single BSCU still includes the same and/or similar safety features as the double BSCU design shown in FIGS. 2 and 3. For example, the single BSCU may include more than three control lanes, and/or further redundancies than the BSCUs shown in FIGS. 2 and 3. Furthermore, in some such examples, all of the converters 140 are in electrical communication with the single BSCU.

In the examples of FIGS. 2 and 3, the converters 140 are electrically connected to the BSCUs 182 and 184 via a suitable digital transmission medium, such as via a physical (e.g., wired) link, and/or via a wireless link.

In one example where the brake control systems 50 include a physical link between the converters 140 and the BSCUs 182 and 184, the brake control systems 50 include a plurality of wires that do not utilize a vehicle bus protocol for transmitting the digital signals output by the converters 140 to the BSCUs 182 and 184. One such example is shown in FIG. 3. In the example of FIG. 3, the second example brake control system 350 includes a plurality of wires 376 that electrically connect the converters 140 to the BSCUs 182 and 184. In the example of FIG. 3, where the brake control system 350 includes twelve converters, the second brake control system 350 includes twenty-four wires: two wires for each of the converters 140, one wire to connect a given converter to the first BSCU 182, and a second wire to connect a given converter to the second BSCU 184.

However, in other examples where the brake control systems 50 include a physical link between the converters 140 and the BSCUs 182 and 184, the physical link supports one or more vehicle bus protocols for transmitting the digital signals output by the converters 140 to the BSCUs 182 and 184. One such example is shown in FIG. 2. In the example of FIG. 2, the first brake control system 250 includes three vehicle buses: a first vehicle bus 170, a second vehicle bus 172, and a third vehicle bus 174. The first vehicle bus 170 electrically connects the first set of converters 144 with the BSCUs 182 and 184, the second vehicle bus 172 electrically connects the second set of converters 146 with the BSCUs 182 and 184, and the third vehicle bus 174 electrically connects the third set of converters 148 with the BSCUs 182 and 184. Thus, the first vehicle bus 170 is electrically coupled to the first set of converters 144 and the BSCUs 182 and 184, the second vehicle bus 172 is electrically coupled to the second set of converters 146, and the third vehicle bus 174 is electrically coupled to the third set of converters 148.

The vehicle buses 170, 172, and 174 comprise one or more of: controller area network (CAN) buses, local interconnect network (LIN) buses, single edge nibble transmission (SENT) and RS485 (also known as TIA-485-A). In particular, the vehicle buses 170, 172, and 174 comprise physical transmission media such as cables (e.g., Ethernet, fiber-optic), wires, bus bars, or other electrically conductive materials that support message-based protocols (e.g., CAN protocols, LIN protocols, etc.) that enable digital communication between controllers (e.g., integrated circuits) of the converters 140 and BSCUs 182 of the first brake control system 250. Thus, the vehicle buses 170, 172, and 174 comprise hardware that is configured to support one or more vehicle bus protocols for communicating between the converters 140 and the BSCUs 182 and 184.

However, in other examples, the brake control systems 50 comprise wireless communication means for providing communication between the converters 140 and the BSCUs 182 and 184. In particular, the converters 140 may comprise a digital transmitter that wirelessly transmits the signals to the BSCUs 182 and 184. The BSCUs 182 and 184 in turn may comprise digital receivers that receive the wireless signals from the converters 140. The converters 140 may utilize various electromagnetic frequencies and/or protocols for wirelessly transmitting the signals including one or more of Bluetooth, ultra-wideband (UWB), ZigBee, and Wi-Fi.

In some examples, the brake control systems 50 additionally include the BSCUs 182 and 184. The BSCUs 182 and 184 are configured to adjust wheel braking based on an indication of the desired braking force supplied by the sensors 120. In particular, the BSCUs 182 and 184 are configured to adjust the amount of braking force applied to one or more wheels of the left-side landing gear 300 and/or one or more wheels of the right-side landing gear 320 based on the received digital signals from the converters 140.

In some examples, the BSCUs 182 and 184 support a symmetric braking system, in which both of the BSCUs 182 and 184 control operation of brakes associated with wheels of both landing gears 300 and 320. Thus, in such examples, both of the BSCUs 182 and 184 are configured to adjust operation of at least one brake of the left-side landing gear 300 and at least one brake of the right-side landing gear 320. Example symmetric braking systems are laid out in U.S. patent application Ser. No. 16/019,729, the entire contents of which are incorporated herein by reference.

Another such example symmetric braking system is shown in FIGS. 2 and 3. In the example of FIGS. 2 and 3, the first BSCU 182 is configured as an outboard BSCU that controls brakes of the outboard wheels of the left and right-side landing gears 300 and 320, respectively. The second BSCU 184 is configured as an inboard BSCU that controls brakes of the inboard wheels of the left and right-side landing gears 300 and 320, respectively.

However, in other examples, the BSCUs 182 and 184 do not support a symmetric braking system. In such examples, each of the BSCUs only controls brakes of one of the landing gears, either the left or right-side landing gear 300 or 320, respectively.

The BSCUs 182 and 184 comprise one or more of: channels 190, 192, and 194, connectors 200, repeaters 210, digital-to-analog converters 216, microcontrollers 220, 222, 224, and 226, logic gate hardware devices 230 and 232, channel buffers 231, and amplifiers 241, 242, 243, 244, 245, 246, 247, and 248.

When included, the connectors 200 are input interfaces that are configured to receive the digital signals from the converters 140. In particular, the connectors 200 are configured to receive the signals from the converters over the wired connection that connects the converters 140 to the BSCUs 182 and 184. The connectors 200 may comprise one or more of a serial, USB, micro USB, FIREWIRE, Lightning, and/or Thunderbolt connection. The connectors 200 may also be configured to receive various pilot inputs (including an indication of the desired braking force) via wireless radio, electrical, and/or optical signals. The connectors 200 also may receive signals from one or more other sources, such as a flight controller that oversees operations of the aircraft.

When included, the channels 190, 192, and 194 (also referred to herein as "control lanes") provide further redundancy and multilayered protection in the event of non-performance. As illustrated in FIGS. 2 and 3, each BSCU 182 and 184 includes two independent control lanes 190 and 194 to control primary brake actuators, and a shared control lane 192 that controls alternate brake actuators and/or emergency shut-off modules. The channels 190, 192, and 194 are independent channels that each comprises their own ports/connector mechanisms (e.g., connectors 200). The channels 190, 192, and 194 comprise analog, digital, or a combination of analog and digital signals. The channel buffers 231 provide independence between the channels 190, 192, and 194. In particular, the channel buffers 231 are positioned between each of the channels 190, 192, and 194 (e.g., at the interfaces between the channels) to ensure that a failure in one of the channels 190, 192, or 194 does not affect the functioning of any of the other channels 190, 192, and 194.

Thus, in some examples, each of the control lanes 190, 192, and 194 comprise one of the connectors 200 for receiving signals from the converters 140. In the examples of FIGS. 2 and 3, the connector of the first independent control lane 190 receives signals from the first set of converters 144, the connector of the second independent control lane 194 receives signals from the third set of converters 148, and the connector of the shared control lane 192 receives signals from the second set of converters 146. That is, the first set of converters 144 is directly electrically connected (e.g., coupled) to the first independent control lane 190 via first vehicle bus 170, the second set of converters 146 is directly electrically connected to the shared control lane 192, and the third set of converters 148 is directly electrically connected to the second independent control lane 194. In the example of FIG. 2, the first channel 145 of the first set of converters 144 is directly electrically connected to the first independent control lane 190 of the BSCUs 182 and 184 via the first vehicle bus 170, the second channel 147 of the second set of converters 146 is directly electrically connected to the shared control lane 192 of the BSCUs 182 and 184 via the second vehicle bus 172, and the third channel 149 of the third set of converters 148 is directly electrically connected to the second independent control lane 194 via the third vehicle bus 174. In the example of FIG. 3, the first channel 145 of the first set of converters 144 is directly electrically connected to the first independent control lane 190 of the BSCUs 182 and 184 via the plurality of wires 376, the second channel 147 of the second set of converters 146 is directly electrically connected to the shared control lane 192 of the BSCUs 182 and 184 via the plurality of wires 376, and the third channel 149 of the third set of converters 148 is directly electrically connected to the second independent control lane 194 via the plurality of wires 376.

The connectors 200 transmit the received signals to the repeaters 210 (when included) that then propagate the signals to the microcontrollers and logic gate hardware devices. In the example of FIGS. 2 and 3, each of the repeaters 210 sends the received signals to all of the microcontrollers and logic gate hardware devices of the BSCU in which is it included. Thus, the three repeaters 210 in the first BSCU 182 each propagate their received signals to first outboard microcontroller 220, second outboard microcontroller 222, and outboard logic gate hardware device 230 of the first BSCU 182. Similarly, the three repeaters 210 in the second BSCU 184 each propagate their received signals to first inboard microcontroller 224, second inboard microcontroller 226, and inboard logic gate hardware device 232.

Interconnecting the three control lanes 190, 192, and 194, in this manner provides redundant internal communication between each of the control lanes 190, 192, and 194 of the BSCUs 182 and 184. This enhances the safety and performance of the BSCUs 182 and 184. In particular, since all of the information received by the BSCUs 182 and 184 is relayed to each of the control lanes 190, 192, and 194 by the repeaters 210, even in the event of non-performance of one of the control lanes 190, 192, or 194, the other properly functioning control lanes still receive all of the information transmitted to the BSCU. Thus, this digital interconnectivity between the control lanes ensures that non-performance of one or more of the control lanes 190, 192, and 194 does not result in the BSCUs receiving less information. In fact, this interconnectivity ensures that non-performance of one of the control lanes does not affect the availability of received data and information. Thus, providing this multiple redundant design in each of the BSCUs increases the robustness, reliability, and performance of the BSCUs 182 and 184, and therefore increases the overall safety of the brake system.

However, in other examples, the repeaters 210 do not propagate their received signals to all of the microcontrollers and/or logic gate hardware device of their associated BSCUs.

Microcontrollers 220, 222, 224, and 226 receive signals from one or more of the repeaters 210, and based on the received signals, adjust operation of one or more primary brake actuators, as will be described in greater detail below. In particular, the microcontrollers 220, 222, 224, and 226 generate command signals that adjust operation of one or more actuators responsible for applying braking forces to the wheels of the landing gears 300 and 320.

As described in U.S. patent application Ser. No. 16/019,729, the entire contents of which are incorporated herein by reference, the BSCUs 182 and 184 generate the command signals based on the indication of the desired braking force received from the converters 140. The commanded braking force may additionally be based on one or more of: an autobrake pressure, a determined (e.g., measured) braking force, and skid pressure. In one example, the BSCUs 182 and 184 utilize a voting scheme for determining the desired braking force (and corresponding command signals).

In some examples, the brake control systems 50 include one or more amplifiers 240 for amplifying the command signals generated by the microcontrollers 220, 222, 224, and 226. In the example of FIGS. 2 and 3, each of the microcontrollers 220, 222, 224, and 226 communicates with two of the amplifiers 240, one for each primary brake actuator. In particular, the first outboard microcontroller 220 outputs a command signal to a first outboard amplifier 241 to control operation of brake module 305 and a command signal to a second outboard amplifier 242 to control operation of brake module 326. Similarly, the second outboard microcontroller 222 outputs a command signal to a third outboard amplifier 243 to control operation of brake module 307 and a command signal to a fourth outboard amplifier 244 to control operation of brake module 328. The first inboard microcontroller 224 outputs a command signal to a first inboard amplifier 245 to control operation of brake module 306 and a command signal to a second inboard amplifier 246 to control operation of brake module 325. The second inboard microcontroller 226 outputs a command signal to a third inboard amplifier 247 to control operation of brake module 308 and a command signal to a fourth inboard amplifier 248 to control operation of brake module 327.

Similar to the microcontrollers, the two logic gate hardware devices 230 and 232 receive signals from one or more of the repeaters 210. The brake control systems 50 may further include one or more digital-to-analog converters 216 between the repeaters 210 and the logic gate hardware devices 230 and 232 to convert the digital signals from the repeaters 210 to analog signals for the logic gate hardware devices 230 and 232. The logic gate hardware devices 230 and 232 comprise configurable hardware/logic devices (i.e. where the hardware/logic itself is not pre-set, and can be adjusted depending on user preferences) such as one or more of: FPGAs, ASICs, PALs, and CPLDs. As will be discussed in greater detail below, the logic gate hardware devices provide enhanced safety because they are configured to only output a firm set of outputs with little to no opportunity for inadvertent outputs. That is, utilizing the logic gate hardware minimizes the risk that the BSCUs will generate and/or propagate inadvertent command signals to the brakes, thereby ensuring that the actual braking forces applied more closely align with the desired braking force commanded by the captain and/or first officer.

The logic gate hardware devices 230 and 232 also control operation of shut-off modules 260 and 270 and alternate brake actuators 316, 318, 336, and 338 to further enhance braking performance, in some examples. In particular, the logic gate hardware devices 230 and 232 may utilize the shut-off modules to override erroneous brake commands from one or more of the microcontrollers 220, 222, 224, and/or 226. Thus, even if erroneous braking forces are commanded, the logic gate hardware devices 230 and 232 can operate the shut-off modules 260 and 270 to prevent these erroneous brake commands from being carried out. Specific examples of the shut-off modules 260 and 270 will be described in greater detail below. The shut-off modules 260 and 270 may also be utilized to reduce leakage of hydraulic fluid in examples where the brake control systems 50 include hydraulic brakes. Further, the logic gate hardware devices 230 and 232 may utilize the alternate brake actuators 316, 318, 336, and 338, when the primary brake actuators fail to provide sufficient braking force.

As introduced above, the BSCUs 182 and 184 control operation of one or more of primary brake actuators, alternate (or back-up) brake actuators, and shut-off brake modules. The brake actuators and modules are all configured to adjust the braking forces applied to the wheels of one or more of the left-side landing gear 300 and right-side landing gear 320.

In some examples, the brake control systems 50 additionally include the left-side landing gear 300 and the right-side landing gear 320. In the examples of FIGS. 2 and 3, the left-side landing gear 300 comprises one or more left-side wheels 301, 302, 303, and 304, and one or more brakes 330. Similarly, the right-side landing gear 320 comprises one or more right-side wheels 321, 322, 323, and 324 and one or more of the brakes 330. However, in other examples, the landing gears 300 and 320 may each include more than or less than four wheels and associated brakes.

In some examples, the brake control systems 50 additionally include brake modules 305, 306, 307, 308, 325, 326, 327, and 328. When included, the brake modules 305, 306, 307, 308, 325, 326, 327, and 328 include the brakes 330, and primary brake actuators 332 and alternate brake actuators 315 that are configured to adjust the brakes 330 to adjust an amount of braking force applied to the wheels 301, 302, 303, 304, 321, 322, 323, and 324.

In particular, and as described above, the primary brake actuators 332 receive command signals from the microcontrollers of the BSCUs 182 and 184 and are configured to adjust an amount of braking force supplied to the wheels 301, 302, 303, 304, 321, 322, 323, and 324 by the brakes 330 responsive to these received command signals. In particular, in the example of FIGS. 2 and 3 each of the wheels includes its own associated brake of the brakes 330, and its own associated primary brake actuator of the primary brake actuators 332. Thus, there is one primary brake actuator for every brake. However, in other examples, other ratios of primary brake actuators to brakes exist.

In the example of FIGS. 2 and 3, the primary brake actuator of brake module 305 receives a command signal from the amplifier 241 of the microcontroller 220, the primary brake actuator of brake module 306 receives a command signal from the amplifier 245 of the microcontroller 224, the primary brake actuator of the brake module 307 receives a command signal from the amplifier 243 of the microcontroller 222, the primary brake actuator of the brake module 308 receives a command signal from the amplifier 247 of the microcontroller 226, the primary brake actuator of the brake module 325 receives a command signal from the amplifier 246 of the microcontroller 224, the primary brake actuator of the brake module 326 receives a command signal from the amplifier 242 of the microcontroller 220, the primary brake actuator of the brake module 327 receives a command signal from the amplifier 248 of the microcontroller 226, and the primary brake actuator of the brake module 328 receives a command signal from the amplifier 244 of the microcontroller 222.

Further, the alternate brake actuators 315 receive command signals from the logic gate hardware devices 230 and 232 and are configured to adjust an amount of braking force applied to the wheels 301, 302, 303, 304, 321, 322, 323, and 324 by the brakes 330 responsive to these received command signals. In particular, in the example of FIGS. 2 and 3 each of the alternate brake actuators 315 adjusts the amount of braking force applied by two of the brakes 330. Thus, for every two brakes there is one alternate brake actuator. However, other ratios of alternate brake actuators to brakes exist in other examples.

In the example of FIGS. 2 and 3, the outboard left-side brake modules (brake modules 305 and 307) share an alternate brake actuator that receives command signals from the logic gate hardware device 230 of the BSCU 182, the inboard left-side brake modules (brake modules 306 and 308) share an alternate brake actuator that receives command signals from the logic gate hardware device 232 of the BSCU 184, the inboard right-side brake modules (brake modules 325 and 327) share an alternate brake actuator that receives command signals from the logic gate hardware device 232 of the BSCU 184, and the outboard right-side brake modules (brake modules 326 and 328) share an alternate brake actuator receives command signals from the logic gate hardware device 230 of the BSCU 182.

In this way, the BSCU 182 controls operation of the outboard left and right-side brakes and the BSCU 184 controls operation of the inboard left and right-side brakes. In particular, the microcontrollers 220 and 222 of the BSCU 182 control operation of the primary brake actuators 332 and the logic gate hardware device 230 of the BSCU 182 controls operation of the alternate brake actuators 315, of the outboard left-side brake modules 305 and 307 and the outboard right-side brake modules 326 and 328. Similarly, the microcontrollers 224 and 226 of the BSCU 184 control operation of the primary brake actuators 332 and the logic gate hardware device 232 of the BSCU 184 controls operation of the alternate brake actuators 315, of the inboard left-side brake modules 306 and 308 and the inboard right-side brake modules 325 and 327.

As mentioned above, the logic gate hardware devices 230 and 232 may control operation of the alternate brake actuators 315 to supply additional braking forces when the actual braking forces applied by the brakes 330 are less than the desired braking forces commanded by the captain and/or first officer. For example, the alternate brake actuators 315 may be used in the event of non-performance events of the primary brake actuators 332 (i.e., when the primary brake actuators 332 are insufficient by themselves to provide the desired braking forces).

In some examples, the brake control systems 50 comprise pneumatic brake control systems, and the actuators 332 and 315 comprise pneumatic actuators. In other examples, the brake control systems 50 comprise hydraulic brake control systems, and the actuators 332 and 315 comprise hydraulic actuators. In some such examples, the actuators 332 and 315 comprise hydraulic servo valves that regulate the supply of hydraulic fluid to the brakes 330 to adjust the braking force supplied to the wheels by the brakes 330. In yet further examples, the brake control systems 50 comprise electric brake control systems, and the actuators 332 and 315 comprise electric actuators (e.g., electric motors).

As introduced above, the brake control systems 50 additionally include shut-off modules 260 and 270, in some examples. The shut-off modules 260 and 270 are configured to remove pressure to the actuators 315 and 332 when braking is not desired. As one example, the logic gate hardware devices 230 and 232 may adjust the shut-off modules 260 and 270 to remove pressure to the actuators 315 and 332 (and thereby inhibit braking forces from being applied to the wheels), when braking is not desired (such as during takeoff). Further, the shut-off modules 260 and 270 may also be utilized to reduce leakage of hydraulic fluid in examples where the brake control systems 50 include hydraulic brakes.

In examples where the brake control systems 50 comprise hydraulic brakes, the shut-off modules 260 and 270 comprise shut-off valves that are adjustable to prevent the flow of hydraulic fluid to the actuators 315 and 332. In examples where the brake control systems 50 comprise electric brakes, the shut-off modules 260 and 270 comprise power-interrupt mechanisms that are adjustable to cut off the supply of electric power to the actuators 315 and 322 (disengage the actuators 315 and 322 from their power source). In examples where the brake control systems 50 comprise pneumatic brakes, the shut-off modules 260 and 270 may comprise valves that are adjustable to prevent the flow of air to the actuators 315 and 332.

As shown in the examples of FIGS. 2 and 3, the example brake control systems 250 and 350 comprise two shut-off modules 260 and 270, and each of the shut-off modules 260 and 270 comprise two internal shut-off mechanisms. Primary shut-off module 260 controls operation of the primary brake actuators 332. In particular, the BSCU 182 is in electrical communication with a first primary shut-off mechanism 262, and the first primary shut-off mechanism 262 is adjustable by the BSCU 182 to enable or disable pressure to the primary brake actuators 332 of the outboard brake modules 305, 307, 326, and 328. The BSCU 184 is in electrical communication with the second primary shut-off mechanism 264, and the second primary shut-off mechanism 264 is adjustable by the BSCU 184 to enable or disable pressure to the primary brake actuators 332 of the inboard brake modules 306, 308, 325, and 327.

Similarly, alternate shut-off module 270 controls operation of the alternate brake actuators 315. In particular, the BSCU 182 is in electrical communication with a first alternate shut-off mechanism 272, and the first alternate shut-off mechanism 272 is adjustable by the BSCU 182 to enable or disable pressure to the alternate brake actuators 315 of the outboard brake modules 305, 307, 326, and 328. The BSCU 184 is in electrical communication with the second alternate shut-off mechanism 274, and the alternate brake actuators 315 of the inboard brake modules 306, 308, 325, and 327.

As noted above, it should be appreciated that in other examples, the brake control systems 50 include only one BSCU. In some such examples, the single BSCU receives signals from all of the converters 140, and/or controls operation of all of the brake modules 305, 306, 307, 308, 325, 326, 327, and 328, and shut-off modules 260 and 270.

Illustrative, non-exclusive examples of inventive subject matter according to the present disclosure are described in the following enumerated paragraphs:

A1. A brake control system, comprising: a first set of analog-to-digital converters in electrical communication with a first set of brake input mechanism sensors; and a second set of analog-to-digital converters in electrical communication with a second set of brake input mechanism sensors; wherein the first and second sets of analog-to-digital converters comprise one or more of different hardware and different software for differentially manipulating sensor outputs received from the brake input mechanism sensors.

A2. The brake control system of paragraph A1, further comprising the first and second sets of brake input mechanism sensors, wherein the first and second sets of brake input mechanism sensors provide an indication of a desired braking force by measuring an actuation state of two or more brake input mechanisms, wherein both the first and second sets of brake input mechanisms sensors measure the actuation state of all of the two or more brake input mechanisms.

A3. The brake control system of any of paragraphs A1-A2, further comprising a first vehicle bus that electrically connects the first set of analog-to-digital converters to one or more brake system control units (BSCUs), and a second vehicle bus that electrically connects the second set of analog-to-digital converters to the one or more BSCUs.

A4. The brake control system of paragraph A3, further comprising the one or more BSCUs, wherein the one or more BSCUs comprise two BSCUs.

A5. The brake control system of any of paragraphs A1-A4, wherein the manipulating the sensor outputs comprises one or more of: converting the sensor outputs from analog to digital signals, encoding the sensor outputs, and demodulating the sensor outputs.

A6. The brake control system of any of paragraphs A1-A5, wherein the first and second sets of analog-to-digital converters comprise configurable logic devices of the same type, but wherein hardware of the first and second sets of analog-to-digital converters is configured differently to manipulate the sensor outputs differently.

A7. The brake control system of paragraph A6, wherein the first and second sets of analog-to-digital converters comprise field-programmable gate arrays (FPGAs), and wherein logic gates of the first and second sets of analog-to-digital converters are interconnected differently to manipulate the sensor outputs differently.

A8. The brake control system of any of paragraphs A1-A7, wherein the first and second sets of analog-to-digital converters comprise microcontrollers, and wherein the first and second sets of analog-to-digital converters comprise different software for manipulating the sensor outputs.

A9. The brake control system of any of paragraphs A1-A8, wherein the first and second sets of analog-to-digital converters each comprise a first channel and a second channel, and wherein the first set of analog-to-digital converters is electrically connected to the first set of brake input mechanism sensors via the first channel, and wherein the second set of analog-to-digital converters is electrically connected to the second set of brake input mechanism sensors via the second channel.

B1. A brake control system, comprising: a plurality of brake input mechanism sensors including a first set of brake input mechanism sensors and a second set of brake input mechanism sensors; a first set of analog-to-digital converters in electrical communication with the first set of brake input mechanism sensors; a second set of analog-to-digital converters in electrical communication with the second set of brake input mechanism sensors; a first vehicle bus that electrically connects the first set of analog-to-digital converters to one or more brake system control units (BSCUs); and a second vehicle bus that electrically connects the second set of analog-to-digital converters to the one or more BSCUs; wherein the first and second sets of analog-to-digital converters comprise different hardware and/or different software for differentially manipulating sensor outputs received from the brake input mechanism sensors.

B2. The brake control system of paragraph B1, further comprising the one or more BSCUs, wherein the one or more BSCUs comprise two BSCUs.

B3. The brake control system of any of paragraphs B1-B2, wherein both the first and second sets of brake input mechanisms provide an indication of a desired braking force by measuring an actuation state of two or more brake input mechanisms.

B4. The brake control system of any of paragraphs B1-B3, wherein the first and second sets of analog-to-digital converters comprise multiple channels, and wherein the first and second sets of analog-to-digital converters are electrically connected to the brake input mechanism sensors via different channels of the multiple channels.

B5. The brake control system of any of paragraphs B1-B4, wherein the different software comprises different computer readable instructions for one or more of converting, demodulating and encoding the sensor outputs.

B6. The brake control system of any of paragraphs B1-B5, further comprising four brake input mechanisms, a third set of brake input mechanism sensors, and a third vehicle bus, wherein the first, second, and third sets of brake input mechanism sensors each comprise four sensors, one for measuring the actuation state of each of the four brake input mechanisms, and wherein the third vehicle bus electrically connects the third set of brake input mechanism sensors with the one or more BSCUs.

B7. The brake control system of paragraph B6, wherein the third set of analog-to-digital converters comprises different hardware and/or different software than the first and second sets of analog-to-digital converters for differentially manipulating sensor outputs received from the brake input mechanism sensors.

B8. The brake control system of any of paragraphs B1-B7, wherein the analog-to-digital converters comprise one or more of field-programmable gate arrays (FPGAs), application-specific integrated circuits (ASICs), digital signal processors (DSPs), microprocessors, microcontrollers, programmable array logic (PALs), and complex programmable logic devices (CPLDs), C1. A brake control system comprising: a plurality of brake input mechanism sensors including first, second, and third sets of brake input mechanism sensors; a first set of analog-to-digital converters in electrical communication with the first set of brake input mechanism sensors; a second set of analog-to-digital converters in electrical communication with the second set of brake input mechanism sensors; a third set of analog-to-digital converters in electrical communication with the third set of brake input mechanism sensors; and a plurality of wires electrically connecting the first and second sets of analog-to-digital converters to one or more brake system control units (BSCUs).

C2. The brake control system of paragraph C1, further comprising the one or more BSCUs, wherein the one or more BSCUs comprise two BSCUs, and wherein each of the two BSCUs comprise three channels, each of the three channels comprising a connector, and wherein the first set of analog-to-digital converters is directly electrically connected to a first channel connector of a first channel of the two BSCUs, the second set of analog-to-digital converters is directly electrically connected to a second channel connector of a second channel of the two BSCUs, and the third set of analog-to-digital converters is directly electrically connected to a third channel connector of a third channel of the two BSCUs.

C3. The brake control system of paragraph C2, wherein the two BSCUs further comprise a first microcontroller in the first channel of the two BSCUs, a second microcontroller in the third channel of the two BSCUs, and a field-programmable gate array (FPGA) in the second channel of the two BSCUs, and wherein the two BSCUs comprise internal circuitry that electrically connects each of the connectors to the FPGA and the first and second microcontrollers.

C4. The brake control system of any of paragraphs C1-C3, wherein the plurality of wires comprise three vehicle buses, and wherein a first vehicle bus electrically connects the first set of analog-to-digital converters to the one or more BSCUs, a second vehicle bus electrically connects the second set of analog-to-digital converters to the one or more BSCUs, and a third vehicle bus electrically connects the third set of analog-to-digital converters to the one or more BSCUs.

D1. A brake control system, comprising:

a first set of analog-to-digital converters in electrical communication with a first set of brake input mechanism sensors; and a second set of analog-to-digital converters in electrical communication with a second set of a plurality of brake pedal actuation state sensors, the second set of the plurality of brake pedal actuation state sensors unique from a first set of the plurality of brake pedal actuation state sensors, wherein the second set of analog-to-digital converters are configured to output a second vehicle bus signal on a second digital subchannel, the second digital subchannel different than a first digital subchannel;

a first vehicle bus that electrically connects the first set of analog-to-digital converters to at least two brake system control units (BSCUs); and a second vehicle bus that electrically connects the second set of analog-to-digital converters to the at least two BSCUs.

D2. The brake control system of paragraph D1, further comprising two or more converter devices, each of the two or more converter devices comprising one of the first set of analog-to-digital converters and one of the second set of analog-to-digital converters.

D2.1 The brake control system of paragraph D2, wherein the brake control system comprises twelve converter devices.

D3. The brake control system of any of paragraphs D1-D2, wherein the first set of analog-to-digital converters comprises four analog-to-digital converters, wherein the four analog-to-digital converters of the first set of analog-to-digital converters are electrically connected to different sensors of the first set of the plurality of brake pedal actuation state sensors.

D4. The brake control system of any of paragraphs D1-D3, wherein the second set of analog-to-digital converters comprises four analog-to-digital converters, wherein the four analog-to-digital converters of the second set of analog-to-digital converters are electrically connected to different sensors of the second set of the plurality of brake pedal actuation state sensors.

D5. The brake control system of any of paragraphs D1-D4, further comprising a left-side captain brake pedal, a right-side captain brake pedal, a left-side first officer brake pedal, and a right-side first officer brake pedal.

D6. The brake control system of paragraph D5, wherein a first analog-to-digital converter of the first set of analog-to-digital converters is electrically connected to a first brake pedal actuation state sensor of the left-side captain brake pedal, a second analog-to-digital converter of the first set of analog-to-digital converters is electrically connected to a first brake pedal actuation state sensor of the right-side captain brake pedal, a third analog-to-digital converter of the first set of analog-to-digital converters is electrically connected to a first brake pedal actuation state sensor of the left-side first officer brake pedal, and a fourth analog-to-digital converter of the first set of analog-to-digital converters is electrically connected to a first brake pedal actuation state sensor of the right-side first officer brake pedal.

D7. The brake control system of any of paragraphs D5-D6, wherein a first analog-to-digital converter of the second set of analog-to-digital converters is electrically connected to a second brake pedal actuation state sensor of the left-side captain brake pedal, a second analog-to-digital converter of the second set of analog-to-digital converters is electrically connected to a second brake pedal actuation state sensor of the right-side captain brake pedal, a third analog-to-digital converter of the second set of analog-to-digital converters is electrically connected to a second brake pedal actuation state sensor of the left-side first officer brake pedal, and a fourth analog-to-digital converter of the second set of analog-to-digital converters is electrically connected to a second brake pedal actuation state sensor of the right-side first officer brake pedal.

D8. The brake control system of any of paragraphs D1-D7, further comprising a third set of analog-to-digital converters in electrical communication with a third set of the plurality of brake pedal actuation state sensors, the third set of the plurality of brake pedal actuation state sensors unique from the first and second sets of the plurality of brake pedal actuation state sensors, and wherein the third set of analog-to-digital converters are configured to output a third vehicle bus signal on a third digital sub-channel, the third digital sub-channel different than the first and second digital sub-channels, and wherein the brake control system further comprises a third vehicle bus that electrically connects a third set of electronic circuits to the at least two BSCUs.

D9. The brake control system of paragraph D8 when depending from any of paragraphs D2-D2.1, wherein each of the converter devices comprises at least one of the first set of analog-to-digital converters, at least one of the second set of analog-to-digital converters, and at least one of the third set of analog-to-digital converters.

D10. The brake control system of any of paragraphs D8-D9, wherein the third set of analog-to-digital converters comprises four analog-to-digital converters, wherein the four analog-to-digital converters of the third set of analog-to-digital converters are electrically connected to different sensors of the third set of the plurality of brake pedal actuation state sensors.

D11. The brake control system of any of paragraphs D8-D10 when depending from any of paragraphs A5-A7, wherein a first analog-to-digital converter of the third set of analog-to-digital converters is electrically connected to a third brake pedal actuation state sensor of the left-side captain brake pedal, a second analog-to-digital converter of the third set of analog-to-digital converters is electrically connected to a third brake pedal actuation state sensor of the right-side captain brake pedal, a third analog-to-digital converter of the third set of analog-to-digital converters is electrically connected to a third brake pedal actuation state sensor of the left-side first officer brake pedal, and a fourth analog-to-digital converter of the third set of analog-to-digital converters is electrically connected to a third brake pedal actuation state sensor of the right-side first officer brake pedal.

D12. The brake control system of any of paragraphs D5-D11, wherein the plurality of brake pedal actuation state sensors detect a degree of actuation of the brake pedals.

D12.1. The brake control system of paragraph D12, wherein the plurality of brake pedal actuation state sensors comprise pedal position sensors.

D12.2. The brake control system of paragraph D12, wherein the plurality of brake pedal actuation state sensors comprise linear variable differential transformers.

D13. The brake control system of any of paragraph D1-D12.2, wherein the vehicle buses comprise controller area network (CAN) buses, and wherein the analog-to-digital converters convert analog signals to CAN signals.

D14. The brake control system of any of paragraphs D1-D13, further comprising the at least two BSCUs.

D15. The brake control system of paragraph D14, wherein a first of the at least two BSCUs controls actuation of a first set of left-side brakes and a first set of right-side brakes, and wherein a second of the at least two BSCUs controls actuation of a second set of left-side brakes and second set of right-side brakes, the second set of brakes unique from the first set of brakes.

D16. The brake control system of any of paragraphs D5-D11, wherein each of the brake pedals are independently actuated such that actuation of one of the captain brake pedals does not actuate one of the first officer brake pedals.

D17. The brake control system of any of paragraphs D1-D16, wherein the plurality of brake pedal actuation state sensors output an analog signal.

D18. The brake control system of any of paragraphs D1-D17, wherein the at least two BSCUs comprise digital-to-analog converters that output an analog signal to a plurality of brake actuator valves.

D19. The brake control system of paragraph D18, further comprising the plurality of brake actuator valves.

D20. The brake control system of paragraph D19, further comprising a plurality of brake actuators, wherein the plurality of brake actuator valves are selectively operable by one or more of the at least two BSCUs to selectively adjust a braking force applied by the plurality of brake actuators.

E1. A brake control system, comprising:
a plurality of brake pedal actuation state sensors;
at least two sets of analog-to-digital converters, wherein each set of converters of the at least two sets of analog-to-digital converters is configured to output a unique vehicle bus signal on a unique digital subchannel, and wherein each set of converters of the at least two sets of analog-to-digital converters is coupled to a unique set of sensors of the plurality of brake pedal actuation state sensor; and
at least two vehicle buses that electrically connect the at least two sets of digital converters to two brake system control units (BSCUs).

E2. The brake control system of paragraph E1, wherein the at least two sets of analog-to-digital converters comprise three sets of analog-to-digital converters, wherein one of each of the three sets of analog-to-digital converters are included in twelve analog-to-digital converter devices, totaling thirty-six analog-to-digital converters.

E3. The brake control system of paragraph E1, wherein the at least two vehicle buses comprise three vehicle buses.

E4. The brake control system of any of paragraphs E2-E3, wherein the plurality of brake pedal actuation state sensors comprises twelve sensors, and wherein each of the twelve sensors is electrically connected to a different one of the twelve analog-to-digital converters.

E5. The brake control system of any of paragraphs E1-E4, wherein each of the at least two vehicle buses electrically connect a different set of the at least two sets of analog-to-digital converters to the two BSCUs.

E6. The brake control system of any of paragraphs E1-E5, further comprising the two brake system control units.

E7. The brake control system of paragraph E6, wherein each of the two BSCUs comprise three separate channels.

E8. The brake control system of any of paragraphs E6-E7, wherein each of the two BSCUs comprise two microcontrollers and one field-programmable gate array (FPGA).

E9. The brake control system of paragraph E8, wherein each of the two microcontrollers and the FPGA receive signals from all of the plurality of brake pedal actuation state sensors.

E10. The brake control system of any of paragraphs E6-E9, wherein both of the two BSCUs control left-side and right-side brakes.

E11. The brake control system of paragraph E10, wherein a first BSCU of the two BSCUs is operable to selectively actuate one or more inboard left-side brakes and one or more inboard right-side brakes, and wherein a second BSCU of the two BSCUs is operable to selectively actuate one or more outboard left-side brakes and one or more outboard right-side brakes.

E12. The brake control system of any of paragraphs E1-E11, wherein the plurality of brake pedal actuation state sensors detect a degree of actuation of the brake pedals.

E13. The brake control system of any of paragraphs E1-E12, wherein the plurality of brake pedal actuation state sensors comprise pedal position sensors.

E14. The brake control system of any of paragraphs E1-E13, wherein the plurality of brake pedal actuation state sensors comprise linear variable differential transformers.

E15. The brake control system of any of paragraph E1-E14, wherein the vehicle buses comprise controller area network (CAN) buses, and wherein the analog-to-digital converters convert analog signals to CAN signals.

F1. An aircraft brake control system, comprising:
a plurality of brake pedal actuation state sensors;

a first brake system control unit (BSCU) in electrical communication with one or more first left-side brakes of one or more first left-side wheels and with one or more first right-side brakes of one or more first right-side wheels, wherein the first BSCU is selectively operable to adjust the one or more first left-side brakes and the one or more first right-side brakes; and a second BSCU, in electrical communication with one or more second left-side brakes of one or more second left-side wheels and with one or more second right-side brakes of one or more second right-side wheels, wherein the second BSCU is selectively operable to adjust the one or more second left-side brakes and the one or more second right-side brakes;

wherein both the first BSCU and the second BSCU are in electrical communication with the plurality of brake pedal actuation state sensors.

F2. The aircraft brake control system of paragraph F1, further comprising the one or more first right-side brakes, the one or more second right-side brakes, the one or more first left-side brakes, and the one or more second left-side brakes.

F3. The aircraft brake control system of any of paragraphs F1-F2, wherein the first BSCU is selectively operable to adjust at least one of the one or more first left-side brakes and at least one of the one or more first right-side brakes at the same time to simultaneously apply braking forces to at least one of the one or more first left-side wheels and to at least one of the one or more first right-side wheels.

F4. The aircraft brake control system of any of paragraphs F1-F3, wherein each brake of the one or more first right-side brakes, the one or more second right-side brakes, the one or more first left-side brakes, and the one or more second left-side brakes comprises a brake actuator and a brake actuator control valve, wherein each brake actuator control valve is selectively operable by one or more of the at least two BSCUs to selectively adjust a braking force applied by the brake actuator.

F5. The aircraft brake control system of any of paragraphs F1-F4, further comprising two or more left-side shut-off valves and two or more right-side shut-off valves, wherein each of the first and second BSCUs is selectively operable to adjust at least one of the two or more left-side shut-off valves and at least one of the two or more right-side shut-off valves to prevent a braking force from being applied to the one or more left-side wheels and the one or more right-side wheels.

F6. The aircraft brake control system of any of paragraphs F1-F4, further comprising one or more first left-side back-up brake actuator control valves, one or more second left-side back-up brake actuator control valves, one or more first right-side back-up brake actuator control valves, and one or more second right-side back-up brake actuator control valves, F7. The aircraft brake control system of paragraph F6, wherein the first BSCU is configured to selectively adjust the one or more first left-side back-up brake actuator control valves and the one or more first right-side back-up brake actuator control valves, and wherein the second BSCU is configured to selectively adjust the one or more second left-side back-up brake actuator control valves and the one or more second right-side back-up brake actuator control valves.

F8. The aircraft brake control system of any of paragraphs F1-F7, wherein the first BSCU and the second BSCU each comprise three independent channels, a first channel comprising a first microcontroller, a second channel comprising a second microcontroller, and a third channel comprising a field-programmable gate array (FPGA).

F9. The aircraft brake control system of paragraph F8 when depending from F4 and F7, wherein each microcontroller is configured to selectively adjust at least one of the brake actuator control valves, and wherein each FPGA is configured to selectively adjust at least one of the back-up brake actuator control valves.

F10. The aircraft brake control system of any of paragraphs F8 and F9, wherein each channel of the BSCUs receives signals from all of the plurality of brake pedal actuation state sensors.

F11. The aircraft brake control system of any of paragraphs F8-F10, wherein the first channel of both BSCUs is directly electrically connected to a first vehicle bus, wherein the second channel of both BSCUs is directly electrically connected to a second vehicle bus, and wherein the third channel of both BSCUs is directly electrically connected to a third vehicle bus.

F12. The aircraft brake control system of paragraph F11, further comprising the first, second, and third vehicle buses.

F13. The aircraft brake control system of any of paragraphs F11-F12, wherein the first vehicle bus is directly electrically connected to a first set of analog-to-digital converters, wherein the second vehicle bus is directly electrically connected to a second set of analog-to-digital converters, and wherein the third vehicle bus is directly electrically connected to a third set of analog-to-digital converters.

F14. The aircraft brake control system of paragraph F13, wherein the first set of analog-to-digital converters comprise a first subchannel, wherein the second set of analog-to-digital converters comprise a second subchannel, and wherein the third set of analog-to-digital converters comprise a third subchannel, wherein the first, second, and third subchannels are distinct from one another.

G1. An aircraft comprising the brake control system of any of paragraphs F1-F14.

H1. An aircraft brake control system comprising:
two or more left landing gear brakes and two or more right landing gear brakes; and
at least two brake system control units (BSCUs), wherein each of the BSCUs is configured to selectively adjust at least one of the two or more left landing gear brakes and at least one of the two or more right landing gear brakes.

H2. The aircraft brake control system of paragraph G1, further comprising the subject matter of any of paragraphs F1-F15.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A brake control system, comprising:
a first set of analog-to-digital converters in electrical communication with a first set of brake input mechanism sensors; and
a second set of analog-to-digital converters in electrical communication with a second set of brake input mechanism sensors; wherein
the first and second sets of analog-to-digital converters comprise one or more of different hardware and different software for differentially manipulating sensor outputs received from the brake input mechanism sensors.

2. The brake control system of claim 1, further comprising the first and second sets of brake input mechanism sensors, wherein the first and second sets of brake input mechanism sensors provide an indication of a desired braking force by measuring an actuation state of two or more brake input mechanisms, wherein both the first and second sets of brake input mechanisms sensors measure the actuation state of all of the two or more brake input mechanisms.

3. The brake control system of claim 1, further comprising a first vehicle bus that electrically connects the first set of analog-to-digital converters to one or more brake system control unit (BSCUs), and a second vehicle bus that electrically connect the second set of analog-to-digital converters to the one or more BSCUs.

4. The brake control system of claim 3, further comprising the one or more BSCUs, wherein the one or more BSCUs comprise two BSCUs.

5. The brake control system of claim 1, wherein the manipulating the sensor outputs comprises one or more of: converting the sensor outputs from analog-to-digital signals, encoding the sensor outputs, and demodulating the sensor outputs.

6. The brake control system of claim 1, wherein the first and second sets of analog-to-digital converters comprise configurable logic devices of the same type, but wherein hardware of the first and second sets of analog-to-digital converters is configured differently to manipulate the sensor outputs differently.

7. The brake control system of claim 6, wherein the first and second sets of analog-to-digital converters comprise field-programmable gate arrays (FPGAs), and wherein logic gates of the first and second sets of analog-to-digital converters are interconnected differently to manipulate the sensor outputs differently.

8. The brake control system of claim 1, wherein the first and second sets of analog-to-digital converters comprise microcontrollers, and wherein the first and second sets of analog-to-digital converters comprise different software for manipulating the sensor outputs.

9. The brake control system of claim 1, wherein the first and second sets of analog-to-digital converters each comprise a first channel and a second channel, and wherein the first set of analog-to-digital converters is electrically connected to the first set of brake input mechanism sensors via the first channel, and wherein the second set of analog-to-digital converters is electrically connected to the second set of brake input mechanism sensors via the second channel.

10. A brake control system, comprising:
a plurality of brake input mechanism sensors including a first set of brake input mechanism sensors and a second set of brake input mechanism sensors;
a first set of analog-to-digital converters in electrical communication with the first set of brake input mechanism sensors;
a second set of analog-to-digital converters in electrical communication with the second set of brake input mechanism sensors;
a first vehicle bus that electrically connects the first set of analog-to-digital converters to one or more brake system control units (BSCUs); and
a second vehicle bus that electrically connects the second set of analog-to-digital converters to the one or more BSCUs; wherein
the first and second sets of analog-to-digital converters comprise different hardware and/or different software for differentially manipulating sensor outputs received from the first and second set of brake input mechanism sensors.

11. The brake control system of claim 10, further comprising the one or more BSCUs, wherein the one or more BSCUs comprise two BSCUs.

12. The brake control system of claim 10, wherein both the first and second sets of brake input mechanisms provide an indication of a desired braking force by measuring an actuation state of two or more brake input mechanisms.

13. The brake control system of claim 10, wherein the first and second sets of analog-to-digital converters comprise multiple channels, and wherein the first and second sets of analog-to-digital converters are electrically connected to the first and seconds set of brake input mechanism sensors via different channels of the multiple channels.

14. The brake control system of claim 10, wherein the different software comprises difference computer readable instructions for one or more of converting, demodulating and encoding the sensor outputs.

15. The brake control system of claim 10, further comprising four brake input mechanisms, a third set of brake input mechanism sensors, and a third vehicle bus, wherein the first, second, and third sets of brake input mechanism sensors each comprise four sensors, one for measuring an actuation state of each of the four brake input mechanisms, and wherein the third vehicle bus electrically connects the third set of brake input mechanism sensors with the one or more BSCUs.

16. The brake control system of claim 15 wherein a third set of analog-to-digital converters comprises different hardware and/or different software than the first and second sets of analog-to-digital converters for differentially manipulating sensor outputs received from the brake input mechanism sensors.

17. A brake control system comprising:
- a plurality of brake input mechanism sensors including first, second, and third sets of brake input mechanism sensors;
- a first set of analog-to-digital converters in electrical communication with the first set of brake input mechanism sensors;
- a second set of analog-to-digital converters in electrical communication with the second set of brake input mechanism sensors;
- a third set of analog-to-digital converters in electrical communication with the third set of brake input mechanism sensors; and
- a plurality of wires electrically connecting the first and second sets of analog-to-digital converters to one or more brake system control units (BSCUs).

18. The brake control system of claim 17, further comprising the one or more BSCUs, wherein the one or more BSCUs comprise two BSCUs, wherein each of the two BSCUs comprise three channels, each of the three channels comprising a connector, and wherein the first set of analog-to-digital converters is directly electrically connected to a first channel connector of a first channel of the two BSCUs, the second set of analog-to-digital converters is directly electrically connected to a second channel connector of a second channel of the two BSCUs, and the third set of analog-to-digital converters is directly electrically connected to a third channel connector of a third channel of the two BSCUs.

19. The brake control system of claim 18, wherein the two BSCUs further comprise a first microcontroller in the first channel of the two BSCUs, a second microcontroller in the third channel of the two BSCUs, and a field-programmable gate array (FPGA) in the second channel of the two BSCUs, and wherein the two BSCUs comprise internal circuitry that electrically connects each of the connectors to the FPGA and the first and second microcontrollers.

20. The brake control system of claim 17, wherein the plurality of wires comprise three vehicle buses, and wherein a first vehicle bus electrically connects the first set of analog-to-digital converters to the one or more BSCUs, a second vehicle bus electrically connects the second set of analog-to-digital converters to the one or more BSCUs, and a third vehicle bus electrically connects the third set of analog-to-digital converters to the one or more BSCUs.

* * * * *